Patented Jan. 27, 1942

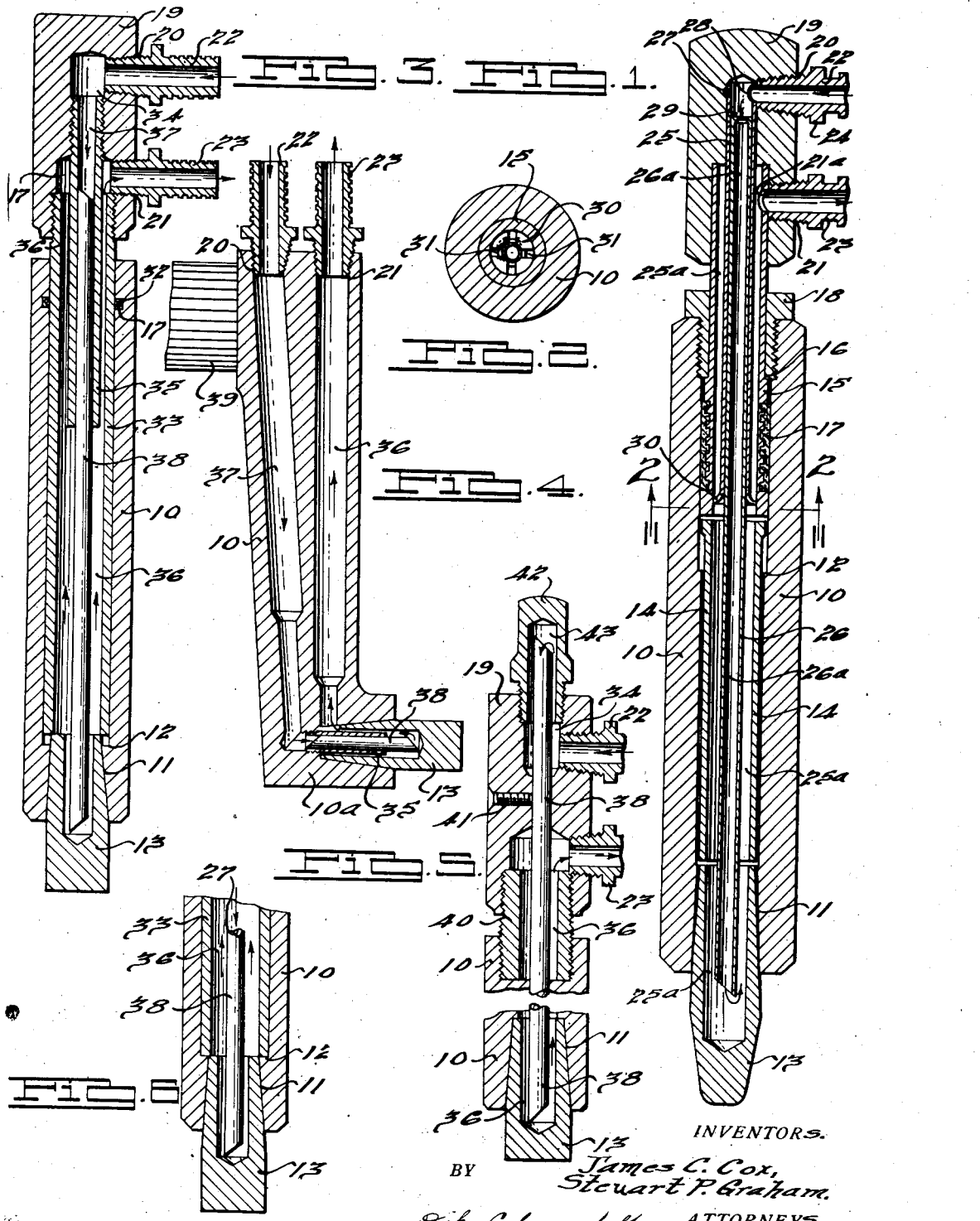

2,271,119

UNITED STATES PATENT OFFICE 2,271,119

WELDING ELECTRODE HOLDER

James C. Cox, Royal Oak, and Steuart P. Graham, Highland Park, Mich., assignors to S-M-S Corporation, Detroit, Mich., a corporation of Michigan Application October 3, 1939, Serial No. 297,735

9 Claims. (Cl. 219—4)

The present invention relates to improvements in welding electrode holders inclusive of electrode tips. More particularly the invention relates to improvements in a device of this character for spot welding purposes, and provides improved cooling means therein, while at the same time providing a holder adaptable for use with any one of a variety of electrode tips. The insertion or removal of the electrode tips is also facilitated by the construction of the novel holder herein disclosed.

In designing electrode holders used for electric resistance welding in general and spot welding in particular, it is necessary to provide an adequate cooling system for cooling both the holder and the electrode tips. In devices of this type previously disclosed no cooling system has been suggested which cools the electrode tip as well as the holder. Also it is necessary to provide such holders with effective, convenient means to facilitate the ready changing of tips and thus to enable the use of tips of various shapes and sizes without damaging the tips or impairing the exterior surfaces thereof, or impairing the electrical contact between such tips and the holder.

It is a principal object of the present invention to provide a welding electrode holder adapted to be readily cooled by a cooling system which cools the holder as well as the electrode tip, the structure being such as to provide a ready and convenient change in tips, to permit use of the particular design and style of tip best adapted for the particular work to be done.

Another object of the invention is to provide a welding electrode holder of the above character which has a cooling system which extends to and cools the electrode tip as well as the other parts of the entire holder.

Still another object of the invention is to provide a welding electrode holder of the above character which is ornamental in appearance, relatively simple in structure, and economical to manufacture.

A further object of the invention is to provide a device of the above specified type in which undesirable leakage of the cooling medium is prevented; and one in which means is provided which during operation of the device is self-regulating to ensure an unimpeded flow of a fluid cooling medium throughout the length of the holder and the tip.

Other objects of this invention will appear in the following description and appended claims, reference being had to the accompanying drawing forming a part of this specification wherein like reference characters designate corresponding parts in the several views.

Fig. 1 is a side elevation in central longitudinal section, of a preferred form of an electrode holder constituting one embodiment of the present invention.

Fig. 2 is a cross section taken substantially on the line 2—2 of Fig. 1 in the direction of the arrows.

Fig. 3 is a view similar to Fig. 1 but shows a form of a holder constituting a modified form of the invention.

Figs. 4 and 5 are views similar to Figs. 1 and 3, each of which shows devices embodying further modifications of the invention.

Fig. 6 is a fragmentary view generally similar to Fig. 3 but shows the lower portion only of the embodiment there shown and indicate the manner in which the electrode tip is rendered removable.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing, a preferred embodiment of the present invention is there shown in Figs. 1 and 2. The reference numeral 10 designates a tubular body which is preferably although not necessarily circular in cross section. This tubular body is formed from a metal preferably of copper or one of the effective electrical conducting alloys composed chiefly of copper which are well known in the art. The body 10 possesses an inwardly tapered or generally cone-shaped mouth 11 leading to a central longitudinal bore which extends throughout the length of the body. However, a portion of the said bore extending from a point near the center throughout the upper section of the body, when the device is positioned as shown in Fig. 1, is of somewhat greater diameter than the bore in the lower portion of the body, thereby forming an internal annular shoulder 12 within the body 10.

Within the mouth 11 is situated a welding tip 13 which is also formed from a suitable metal, preferably from the same metal making up the body 10. This tip may be of any satisfactory desired shape or form and is provided with a longitudinal bore which, however, does not continue throughout its length but dead ends near one extremity thereof as shown in the drawing. The outer walls defining the opened end of the tip 13 are also inwardly tapered but somewhat more so than the mouth 11 so that the tip may be easily inserted in the mouth but become firmly retained when driven in place.

Within the aforementioned lower and narrower portion of the central longitudinal bore of the body 10 is situated a lower tubular sleeve 14 which is dimensioned to fit freely within the said bore but to leave a clearance so that the same is easily movable therewithin; and is preferably of a floating construction. This sleeve 14 is of sufficient length to extend somewhat above or beyond the shoulder 12 and its upper end is enlarged so that the sleeve is prevented from falling out of the body when the tip is removed, since the said enlarged end will, in that event, contact the shoulder 12 and hold the sleeve within the body. The sleeve 14 possesses relatively thin walls so that its central bore is correspondingly large thereby forming a part of a comparatively wide internal passage 25a described in detail hereinafter.

Within the upper or relatively wide portion of the internal bore of the body 10 is situated an additional tubular sleeve 15. This sleeve is provided with an upper portion of narrower diameter than its lower portion which upper portion protrudes or extends through the upper open end of and beyond the body 10, which structure forms an annular shoulder 16 on the sleeve 15. The wider portion of the sleeve 15, that is the portion below the shoulder 16, is dimensioned to fit snugly within the upper portion of the aforesaid bore in the body 10 so that the sleeve 15 is slidably maintained within the body 10; but, unlike the sleeve 14, is not preferably of a floating construction. Within the walls of the sleeve 15 is formed an irregularly shaped cut-out portion such, for example, as that resulting from a relatively heavy threading. Within this cut-out portion is provided a suitable type of packing material 17 such, for instance, as felt, rubber or the like which, if desired, may contain a lubricant, such as graphite. However any suitable packing means may be employed and the aforesaid cut-out portions of the sleeve 15 may be dispensed with, so long as a satisfactory means of retaining the packing in place is substituted. The sleeve 15 is retained within the body 10 by the nut or insert piece 18 which is fixed within the upper open end of the body 10, that is the end oppositely disposed from the mouth 11, by any suitable means, such as by being threaded therewithin. It will be noted that the lower extremity of the nut 18 contacts the shoulder 16 on the sleeve 15 and thereby holds the sleeve in position. Equivalent retaining means, may, however, be employed.

The reference numeral 19 represents a metallic cap which is provided with a longitudinal bore extending for approximately half of its length which bore is dimensioned to fit tightly over the protruding end of the sleeve 15. The cap is positioned over the said sleeve and is retained thereupon by means of this bore as shown. However, it may be held thereupon by other suitable means. The cap 19 is also provided with another longitudinal bore of lesser diameter which extends from the aforesaid bore longitudinally into the cap but not throughout its entire length thereby creating in the cap a solid closed end portion. In addition, a pair of openings 20 and 21 extending laterally in the cap 19 and leading outside thereof are provided. An aperture shown at 21a in the sleeve 15 registers with the opening 21 thereby connecting the latter with the hollow central portion of the sleeve 15.

Within these openings 20 and 21 are situated nipples 22 and 23 dimensioned and formed to fit therein and which are removably fixed in place by any suitable means such as by means of the threading indicated in Fig. 1. These nipples possess internal longitudinal bores extending throughout their length and are preferably provided with irregularities on their outer surfaces as shown. They may also possess a laterally extending portion 24 suitably shaped to be gripped by a wrench or the like to aid in their insertion or removal.

The cap 19 carries a pair of interfitted tubes 25 and 26, the latter being of somewhat lesser diameter than the former and being telescoped therewithin for substantially free longitudinal sliding movement. The tube 25 is held within the cap 19 by means of the laterally extending protuberance or lug 27 thereon which engages or is placed within a suitably positioned notch in the upper portion of the bore in the cap 19, thereby preventing sliding movement of the tube 25 relative to the body 10. The tube 25 is also provided with an aperture indicated at 28 (Fig. 1) which is positioned to register with the inner end of the longitudinal bore of the nipple 22. An internal laterally extending lug 29 is also provided on the tube 25 the purpose of which is pointed out hereinafter. Moreover, the tube 25 extends beyond the cap 19 into the hollow center of the sleeve 15 terminating in a fluted or flared portion 30 as shown in Fig. 1 near the lower extremity thereof. This flared portion 30 is provided with a plurality of slots 31—31 or similar openings arranged in the manner shown in Fig. 2. Since the diameter of the tube 25 is less than that of the bore within the sleeve 15, an annular passage 25a defined at its upper part by the outer walls of the tube 25 and inner walls of the sleeve 15 is formed, which passage is in part cut off by the flared portion 30 of the tube 25 but which permits a continuous passage of fluid through the slots 31—31, as clearly shown in Fig. 2. The lower portion of the passage 25a is formed by the inner walls of the floating sleeve 14 and the outer walls of the tube 26 as is also shown in Fig. 1.

The tube 26 is upset inwardly at its upper end which upset portion engages the lug 29 thereby preventing the tube 26 from sliding therebeyond and blocking off the aperture 28. This tube is considerably longer than the tube 25 and extends substantially throughout the length of the holder, which holder is of sufficient length to project into the tip 13 and is freely movable so that it may be positioned at the bottom of the bore within the tip. As a result of this structural feature of our invention, the passage 25a continues throughout the length of the holder terminating in the lower end of the bore within the tip 13 and leading from the bore in the nipple 23 by means of the aperture 21a in the sleeve 15. The tube 26 is provided with an inclined or beveled lower end so that the resultant relatively sharp end will engage the tip 13 thereby always ensuring an unclosed passage leading from the bore in the tube 25 into the interior of the tip.

It will be noted that the bore within the nipple 22 leads to the central bore within the freely movable tube 26 by means of the aperture 28 thereby creating an additional passage 26a which runs longitudinally throughout the holder. This passage 26a is separated from the passage 25a at its upper portion by the walls of the tubes 25 and 26, and at its lower portion by the walls of the tube 26 alone. It will also be noted that the passages 25a and 26a are interconnected at or very near the lower end of the bore in the tip 13 which interconnection constitutes the sole meeting point of these passages.

The operation of the device embodying the present invention is as follows: The body portion 10 is designed and dimensioned to be held by the electrode clamp of a conventional electric resistance welding machine and to receive and conduct electrical energy provided thereby. The nipples 22 and 23 are connected respectively to inlet and outlet conduits which may be associated with the said machine or may lead to a separate source of cooling medium. The passage 26a together with the inner bore of the nipple 21 forms a continuous conduit for a suitable medium, such as cold water or the like, which is circulated under pressure through the present electrode holder. The cooling medium passes through the passage 26a and leaves it at its lower terminus, namely at the lower extremity of the tube 26 and enters the passage 25a at the latter's lower end within the tip 13; that is, within the lower portion of the bore within the latter. This cooling medium then travels upwardly, that is, in the direction of the cap 19 throughout the length of the annular passage 25a surrounding the tube 26 and the tube 25 as it does so, finally entering the outlet nipple 23 and leaving the holder through the bore therein. As more of the cooling medium enters the nipple 22 a corresponding amount is forced through the circulatory system just described. It follows that a constant circulation of medium is maintained following the path mentioned, which path is clearly indicated by the arrows in Fig. 1. It will be understood, however, that this flow may be reversed as to direction, that is, that the passage 26a may become the outlet passage while the passage 25a becomes the inlet passage. Whatever the direction of the flow, it will be observed that the cooling medium is carried within the electrode tip thereby removing the heat created within the tip, consequently providing an effective cooling system. In addition, the beveled end of the tube 26 aids in preventing a stoppage or cutting off of the flow of cooling medium, for the tube 26 may be driven against other parts of the holder, such as the tip 13, and still provide an open path.

It will be noted that the inwardly upset end of the tube 26 provides a narrow opening or aperture leading into the central bore thereof. Moreover, the tube 26 is freely movable within its encasing tube 25 and is of a floating construction, that is, it may be very freely movable therewithin. As a result of this structure the incoming cooling medium fed through the nipple 22 and opening 28 builds up pressure at the upset end of the tube 26 forcing the same downwardly, that is, forcing it to slide relative to the tube 25 in the direction of the tip 13. This sliding movement will cease only when the beveled end of the tube 26 contacts the end of the recess chamber within the tip 13. Therefore, the position of the tube 26, the cooling medium feeding tube, is at all times during operation of the device automatically regulated so that it will discharge the medium at the end of the recess in the tip and, consequently, provide a cooling of the tip at the point where cooling is most needed. Furthermore, this regulation of the device is automatic and controlled by the flow of cooling medium. In addition, the tube 26 is readily inserted within its encasing tube 25 due to the flared end portion 30 of the latter which guides and directs into place the end of the tube 26.

It will also be noted that whatever the size or shape of the electrode tip 13 which may be employed, that this tip is operative with our holder provided that the tapered portion thereof is shaped to be operatively retained within the mouth 11 of the body 10. Preferably the taper on the tip is somewhat more marked than that of the mouth at least at the upper portion of the tip so that the tip may be readily inserted but will become tightly retained in place when driven into the mouth. It follows that the holder may be readily utilized with any one of a large assortment of tips of various types and shapes and is, therefore, adaptable for a large number of different welding operations and purposes since a tip particularly suited for the job under construction may be selected.

Moreover, the holder is constructed to provide an exceptionally rapid and convenient method of changing the tip utilized therewith. Since the cap 19 is tightly retained over the sleeve 15 it is evident that sliding movement of the sleeve 15 relative to the body 10 may be achieved by pushing the cap in the direction of the nut 18. This sliding movement will be transferred from the sleeve 15 to the sleeve 14, the lower end of which is positioned adjacent to the inwardly extending end of the tip 13. Consequently, the sleeve 14 will contact the said end of the tip and force the same from the mouth 11 or at least loosen it sufficiently to that the tip may be readily removed by hand. This removal operation may be effected, for example, by a striking of the cap 19 at its closed end portion by any suitable means, such as with a hammer or the like. It will be noted that the shoulder 12 acts as an end stop for the downward movement of the sleeve 14 thereby preventing the latter from being driven out of the body 10. It is evident that the sleeve 15 and cap 19 cannot be so removed from the body. It will be readily understood that after a tip has been so removed another tip may be inserted by placing the tapered end thereof within the mouth 11 and driving the tip in place. Such an operation slides the sleeve 14 upwardly, that is, in the direction of the cap 19 so that this sleeve as well as the sleeve 15 and the cap 19 which are moved by the sleeve 14, resume their normal operating positions which places the holder in condition for operation and for a further change in tips when such a change is desired.

The modified form of the invention shown in Fig. 3 comprises a tubular body 10 similar to that of the preferred structure and is formed from an electrically conductive metal, preferably copper. The longitudinal bore in the body 10 is, in the present instance, of substantially uniform diameter. The body portion 10 also possesses an inwardly tapered or generally cone-shaped mouth 11 leading to its hollow center, but is provided with an annular slot or recess 32 formed in its inner walls as by a machining operation. In the slot 32 is situated the packing 17 or a gasket or washer which may be shaped and sized to fit within the said slot and which is adapted to function as a seal. This gasket or washer is preferably made of rubber or the like. The aforesaid slot as well as the packing or sealing means therein may be positioned at any suitable place on the inner walls of the tubular body 10, but are preferably located near the top or upper end thereof as shown in Fig. 3.

Instead of the lower floating sleeve 14 and upper slidable sleeve 15 of the preferred structure, in the present modification a single hollow tubular sleeve 33 is provided which is dimensioned to telescope slidably but snugly within the central hollow or longitudinal bore of the body 10. However, the length of the sleeve 33 is such that its upper end portion projects above the body 10 and may bear an external threaded area as shown. To the sleeve 33 is secured a substantially cylindrical metallic cap 19 generally similar to that of the previously described structure. This cap 19 may contain internal threads cut into the lower part of the inner walls, defining its internal longitudinal bore, which threads engage those of the sleeve 33 to provide a removable union between the cap 19 and the sleeve 33 on assembly. However, the members just named may be secured together in any suitable manner or may be made in one piece, if desired, but a removable joining thereof particularly by means of threads in the manner explained constitutes a preferred structure.

The hollow central portion or longitudinal bore of the cap 19 is, in the present modification, irregular in size, possessing a relatively large lower end or mouth, the diameter of which is approximately equal to that of the bore within the body 10. The intermediate portion of this bore is considerably narrower than the portion immediately preceding it, that is, it is smaller in diameter than the aforesaid mouth portion, while the upper end thereof is somewhat widened to form an internal pocket or chamber 34 (Fig. 3). The bore within the cap 19 leads to the exterior of the holder in each of two separate places by means of lateral openings 20 and 21 in the side walls of the cap 19 as in the preferred structure. The said openings are positioned to meet the bore at each of its upper and lower relatively widened portions, and nipples 22 and 23, previously described, are inserted within them.

To the cap 19 a cylindrical insert or additional hollow tube 35 is secured. This tube 35 is fixed at its upper end to the side walls of the bore within the cap 19 at the relatively narrow intermediate portion thereof as indicated in Fig. 3. Any suitable means of so securing this tube 35 may be employed but a threaded union is preferable because it allows a removal of the said tube. The tube 35 is comparatively extensive in length and projects well into the central space within the sleeve 33 as best shown in Fig. 3. However, in diameter the tube 35 is narrower than the lower part of the said bore in the cap 19 as well as narrower than the central space within the sleeve 33. It follows that, for the portion of the electrode holder inclusive of the tube 35, there is formed an annular passage 36 similar to the passage 25a in the preferred structure which passage starts in the cap 19 and continues within the sleeve 33. This conclusion follows because the center of each of the longitudinal bores in the cap 19 and the sleeve 33 is occupied by the tube 25 whereas the outer peripheral space of each surrounds this tube to form the said annular passage 36. It will also be noted that such a structure separates the chamber 34 in the cap 19 and its appurtenant opening 20 from the passage 36 and its appurtenant opening 21. Moreover, the central bore of the tube 35 leads into the chamber 34 and creates together therewith an additional and separate inner passage within the holder indicated by the numeral 37.

Within the tube 35 an additional hollow tube 38 generally similar to the tube 26 of the preferred structure is telescoped. The tube 38 is dimensioned to fit snugly within the tube 35 but is movable therewithin in a longitudinal plane. Moreover, the tube 38 is relatively extensive in length projecting well into the tube 35 and continuing throughout the length of the body portion 10 inclusive of the mouth 11 thereof. It will be noted that the above structure makes the tube 38 adaptable for sliding movement within its encasing tube 35, thus rendering it adjustable as to length by sliding it to a selected position. It will also be noted that the hollow bore within the tube 38 forms a continuation of the passage 37 while at the same time the outer walls of this tube 38 serve to separate the passage 36 from the passage 37, and therefore, causes a continuation of the annular shape of the former throughout the length of the body portion 10. The tube 38, like the tube 26 preferably possesses inclined or beveled ends as shown in the drawing.

Within the tapered mouth 11 of the body 10 is inserted the electrode tip 13 which is also inwardly tapered and is shaped and dimensioned to fit tightly within the mouth 11. However, in the present modification of our invention the end of the said tapered portion of the tip 29 projects into the hollow central space within the body 10 and contacts the lower extremity of the sleeve 33, as shown, especially in Fig. 3. The bore or hollow center of the tip 19 meets and unites with the passage 36 and forms a further continuation thereof as well as creating a closed end therefor in the manner clearly shown in the drawing particularly in Figs. 3 and 6. It will be noted that the tube 38 extends into the aforesaid bore and is so adjusted that its lower end is positioned near the termination of the bore. As a result of such a construction and arrangement of parts, the passages 36 and 37 are interconnected at or very near the lower end of the bore which interconnection constitutes the sole meeting point of these passages, in a manner similar to the passages 25a and 26a of the preferred structure.

The operation of the present modification of the device is very similar to that of the above described preferred structure. It will be noted, however, that the tube 38 must be adjusted by hand within its encasing tube 35 and is not automatically adjustable as is the tube 26. The flow of the cooling medium through the holder and tip remains as described and is clearly indicated by the arrows in Fig. 3. However, it will be noted that the tip 13, while rendered removable in a way generally similar to the way previously pointed out is removed by means of a single sleeve 33 connected to the cap 19 instead of by means of the cooperating pair of sleeves 14 and 15.

A further modification of the present invention is shown in Fig. 4. Except in the ways pointed out expressly hereinafter, this modification resembles that of the structure described in the last preceding paragraphs and depicted in Fig. 3. The principal structure difference thereover involves an alteration in shape of the body portion 10 which in the present modification possesses an approximately right angled lower extremity 10a so that the present device is an offset electrode holder. Such an alteration of the body portion necessitates certain further changes in structure as follows: Since the tube 38 as well as its encasing tube 35 must lie adjacent the tip 13 in order that the feeding passage 37 may terminate therein and thus provide effective cooling of the electrode tip, the elements named are situated within the portion 10a of the body 10 instead of the body 10 itself. Except for this change in location and a consequent shortening of the tube 38, as shown, the structure of the parts just referred to remains as previously described. Moreover, as a result of this change in location of the tubes 38 and 35, the sleeve 33 is eliminated from the present modification since this sleeve cannot be made to extend beyond the upper end of the body 10 due to the altered shape thereof. It follows that the tip 13 is not suited in the present modification to be removed by a knockout blow in the manner pointed out above. However, this tip 13 is removable and in the present modification also tips of various kinds and types may be employed. It will also be observed that the nipples 22 and 23 lead directly into the body 10 and that the openings 20 and 21 are situated therewithin rather than within the cap 19 which is also eliminated from the present modification. However, these openings interconnect with and form a part of the passages 36 and 37 so that a circulatory system is established which provides circulation of the cooling medium through the holder and the electrode tip.

The operation of this modification of the invention remains as described in detail above so far as the cooling operation is concerned. Since this modification involves an offset electrode holder, the usual shank indicated herein by the numeral 39 is provided and is utilized as that portion of the electrode holder adapted to fit within a welding machine or clamp thereon.

Still another modification of the present invention is depicted in Fig. 5. This modification also resembles the structure shown in Fig. 3 differing therefrom only in minor details. In the present modification a threaded hollow pipe coupling 40 is utilized to interconnect the cap 19 and the body 10. Such structure eliminates the sleeves 33 and 15 utilized for a similar purpose in the formerly described embodiment of the invention. As indicated in Fig. 5, the body portion 10 is adapted to be threaded upon one end of this coupling 40 while the cap 19 engages the threads upon the other end thereof. It follows that in this modification also, the tip 13 is not adapted to be removed by a knockout blow, but remains removably inserted within the mouth 11 of body 10, which is designed to receive tips of various types and shapes. It will also be noted that in the present modification the tube 35 has been eliminated and that the tube 38 is tightly fitted in place, but is movable within the relatively narrow central portion of the bore within the cap 19. If desired, a setscrew 41 may be threaded laterally into the side wall of the cap 19 and be utilized to secure the tube 38 in place once it is adjusted for use with a particular type of electrode tip. Moreover, in the present modification, the cap 19 may possess an additional hollow cap 42 which is threaded into its upper end and the central space of which leads into an upper chamber 43 in the cap. Such a structure allows the use of a longer tube 38.

It will be readily understood that the operation of the present modification remains as described hereinbefore and that the circulatory system there explained in detail is also utilized in the present modification, as clearly indicated in Fig. 5.

We claim:
1. An electrode device for welding purposes comprising an open-ended hollow tubular body, a hollow tip having a closed end removably retained in one end of the body; and means for circulating a cooling medium within the body and tip as well as for removing the latter, said means having a supporting portion retained within the other end of the body, a hollow tube carried by the said supporting portion adjustable longitudinally relative thereto, said tube extending throughout the length of the central hollow of said body into the hollow of said tip, and a member retained within said body for sliding movement relative thereto and extending to a point adjacent said tip thereby being adapted to removably contact said tip.

2. In an electrode holder for welding purposes, a body portion having an internal passage; means movable within said passage and adapted to cooperate therewith to form an internal conduit of adjustable length within said body portion; a tip having a longitudinal bore for a part of its length, said tip being removably inserted within one extremity of said body portion and having its internal bore aligned with said internal passage and arranged to receive the end of said internal conduit, and a sleeve movably retained within the passage of the body portion in contact with the inserted tip and adapted to be driven against the tip for removing the same from the body.

3. An electrode holder for welding purposes, comprising a hollow tubular body having a hollow sleeve movably telescoped within it; a tube situated within the central space in the said sleeve, and adapted for in and out sliding movement relative thereto, whereby the projecting length of the said tube is rendered adjustable; and a cap removably secured to the top of the sleeve, which cap possesses a bore into which the upper end of the said tube extends as well as possessing an opening leading into the aforesaid bore and an additional and separate opening leading into the hollow center of the said tube.

4. An electrode holder for welding purposes, comprising a hollow tubular body terminating in an outwardly tapered mouth and having a hollow sleeve fixed for linear movement within its hollow center, which sleeve extends to a point slightly above the said mouth; a tube fixed for linear movement relative to the said body and extending throughout the length of the said sleeve as well as of the said body; and an electrode tip removably fixed within the said mouth, the upper extremity of which contacts the lower end of the sleeve and is adapted to be forced from the holder on a downward sliding of the sleeve relative to the body.

5. An electrode holder for welding purposes comprising an open-ended hollow tubular body, a tip inserted in one open end of said body, a pair of adjacently positioned hollow sleeves movably retained within the central bore of said body, one of which projects through one open end thereof and the other having a terminus immediately adjacent said inserted tip, a recessed cap carried by the said projecting sleeve and having a pair of separated ducts leading to its recess, and a pair of telescoped tubes carried by the said cap the inner one being floatingly retained within the outer one, whereby a cooling fluid may be introduced into the tip, said tip being adapted to be driven from the body by sliding movement of said sleeves in the direction of said tip relative to said body.

6. An electrode holder comprising a hollow body portion having a tip engaging opening communicating therewith, a welding tip having an internal fluid-tight recess removably secured in said opening, a cooling system including an adjustable tube adapted to be connected with a source of cooling fluid and adapted to discharge said fluid adjacent the end of the recess in said tip, and tip removing means including a member movably retained in the hollow of said body portion and terminating adjacent the tip engaging opening therein and adapted to removably contact said tip on being moved toward said tip engaging opening.

7. In an electrode holder, a hollow body portion having a tip engaging opening communicating therewith, a welding tip removably inserted in said opening and extending therethrough into the hollow of said body portion, and tip removing means including a sleeve slidingly retained in said body portion and contacting the aforesaid extending portion of said inserted tip.

8. In an electrode holder for welding purposes, a body portion having an internal passage; means movable within said passage and adapted to cooperate therewith to form an internal conduit of adjustable length within said body portion; a recessed tip removably maintained at one extremity of said body portion, said tip having its recess communicating with the internal passage of the body portion and arranged to receive the end of said internal conduit; and a member in said passage and movable therein, said member being disposed adjacent said tip and adapted to removably contact the same.

9. In an electrode holder, a hollow body having an open end, a welding tip removably maintained in said open end, and tip removing means including a member disposed in the hollow of said body, a portion of which member lies adjacent the inner end of said tip, said member being movable relative to said body toward said tip thereby being adapted when so moved to removably contact the tip.

JAMES C. COX.
STEUART P. GRAHAM.